United States Patent [19]

Mehta et al.

[11] Patent Number: 4,529,478
[45] Date of Patent: Jul. 16, 1985

[54] ROTARY PROCESSORS AND VACUUM SYSTEMS

[75] Inventors: Pradip S. Mehta; Lefteris N. Valsamis, both of West Haven, Conn.

[73] Assignee: USM Corporation, Farmington, Conn.

[21] Appl. No.: 532,156

[22] Filed: Sep. 14, 1983

[51] Int. Cl.³ .................. B01F 7/10; B21C 23/00; B29B 3/02
[52] U.S. Cl. ........................... 159/9.1; 159/11; 159/11.1; 202/236; 366/97; 366/307; 425/374; 425/466
[58] Field of Search ............ 159/2 E, 6 W, 7, 9 R, 159/9 A, 11 R, 11 A, 13 R, 47 R, DIG. 16, 49, DIG. 25; 425/203, 374, 466; 366/97, 99, 75, 76, 307, 315; 72/262; 203/89; 202/236

[56] References Cited

U.S. PATENT DOCUMENTS

| | | | |
|---|---|---|---|
| 3,992,500 | 11/1976 | Kruder et al. | 264/102 |
| 4,329,065 | 5/1982 | Hold et al. | 366/97 |
| 4,389,119 | 6/1983 | Valsamis et al. | 366/99 |
| 4,402,616 | 9/1983 | Valsamis et al. | 366/99 |
| 4,411,532 | 8/1983 | Valsamis et al. | 366/99 |

*Primary Examiner*—Frank Sever

*Attorney, Agent, or Firm*—Frances P. Craig

[57] ABSTRACT

Novel rotary processors which involve a devolatilizing stage including a rotatable element carrying a plurality of annular channels and a stationary element providing a coaxial closure surface operationally arranged with the channels to provide enclosed processing passages. Each passage of the devolatilizing stage includes inlet means, outlet means and a channel blocking member all associated with the stationary element and arranged and adapted so that material fed to the inlet can be carried forward by the rotatable channel walls to the blocking member for discharge from the passage. The passages are interconnected by material transfer grooves formed in the closure surface.

The rotary processors of this invention include a novel vacuum system to evacuate the devolatilizing stage. A large manifold completely encloses a relatively large opening through the stationary element and communicates with a vacuum source through a relatively large vacuum port to simultaneously evacuate the passages of the devolatilizing stage at low vapor velocities. The novel vacuum system also includes means to effectively prevent material buildup at least in the region of the opening through the stationary element and the manifold.

12 Claims, 17 Drawing Figures

ROTARY PROCESSORS AND VACUUM SYSTEMS

BACKGROUND OF THE INVENTION (1) The Field of the Invention

This invention relates to processing apparatus. More precisely, this invention relates to rotary processors particularly useful for processing materials containing dispersed volatiles.

(2) Description of the Prior Art

Rotary processors are known to the art. Details relating to such processors are described in U.S. Pat. Nos. 4,142,805; 4,194,841; 4,207,004; 4,213,709; 4,227,816; 4,255,059, 4,289,319; 4,300,842; 4,329,065; 4,389,119; 4,413,913; 4,402,616; 4,411,532 and 4,421,412.

Essential elements of the basic individual processing passage of rotary processors disclosed in the above Patents comprise a rotatable element carrying at least one processing channel and a stationary element providing a coaxial closure surface operationally arranged to form with the channel an enclosed processing passage. The stationary element has an inlet for feeding material to the passage and an outlet for discharge of material from the passage. A member providing a material blocking and material collecting end wall surface is also associated with the stationary element and arranged near the outlet. The end wall surface is adapted to block movement of material fed to the passage and to coact with the moving channel walls to establish relative movement between the blocked material and the moving channel walls. This coaction permits material in contact with the moving walls to be dragged forward to the end wall surface for collection and/or controlled processing and/or discharge.

As disclosed in the above Patents, the processing passages present a highly versatile processing capability. The passages are adaptable for performing such processing operations as melting, mixing, pressurizing, pumping, devolatilizing and homogenizing, among others, as well as adding ingredients to or withdrawing ingredients from materials processed in the passage.

U.S. Pat. Nos. 4,329,065 and 4,413,913 relate to apparatus and method, respectively, for devolatilizing liquid materials. In accordance with the apparatus and method disclosed therein, material is fed to the processiong passage and, near the inlet, the material is spread as thin films on the sides of the rotating channel walls. A void space is provided downstream of the spreader and a vacuum source is connected to the void space so that volatile materials can be withdrawn from the surfaces of the thin films carried through the void space. The films may be respread on the channel walls at selected positions about the circumference of the passage to provide more than one void space where the renewed surfaces of the respread films can be exposed to vacuum. The thin films are carried forward through the passage toward the material collecting end wall surface where the films are scraped from the walls and collected for discharge. Usually the material is discharged to another devolatilizing passage where it is again spread on the walls and exposed to vacuum in the manner described to achieve the desired degree of devolatilization. A port opening in the stationary element provides communication between the vacuum source and the void space in the processing passage.

Commonly owned, copending U.S. patent application Ser. No. 532,166 filed on the same day as this application by P. S. Mehta, L. N. Valsamis and Z. Tadmor relates to novel apparatus and method for devolatilizing materials. Although Application Ser. No. 532,166 is not prior art, the apparatus and method disclosed therein is important to the background of this invention. Essentially the novel apparatus and method disclosed involve a devolatilizing stage which comprises a rotatable element carrying at least two annular channels and a stationary element providing a coaxial closure surface operationally arranged with the channels to provide at least first and last enclosed devolatilizing passages. The first devolatilizing passage of the stage includes an inlet associated with the stationary element for receiving material to be processed in the stage. The last devolatilizing passage of the stage has an outlet associated with the stationary element for discharging processed material from the stage. Each devolatilizing passage of the stage includes a blocking member associated with the stationary element which provides an end wall surface for the passage. The blocking members are arranged and adapted so that material fed to the passages of the devolatilizing stage can be carried forward by the rotatable channel walls to the end wall surfaces where movement of the carried forward material is blocked and the blocked material is collected for discharge from the passages. One or more transfer grooves are formed in the coaxial surface of the stationary element and positioned near the end wall surface(s). These transfer grooves are arranged to interconnect adjacent devolatilizing passages so that material blocked and collected in one passage can be transferred to an adjacent devolatilizing passage. Additionally, the devolatilizing stage includes a vacuum source arranged and adapted for operational communication with the devolatilizing passages.

The novel rotary processors of the invention of the above Application provide an improved devolatilizing stage which is designed to achieve devolatilization by way of a mechanism involving three steps: (1) nucleation of bubbles of volatiles material within the processing material, (2) growth of the bubbles and (3) rupture of the bubbles. This mechanism does not require spreading of the material on the channel walls as thin layers, but nevertheless provides extremely efficient mass transfer of volatiles from processing materials including viscous, viscoelastic materials. Copending application Ser. No. 532,166 is incorporated herein by reference.

The present invention provides a highly effective vacuum system for the devolatilization apparatus and methods disclosed and claimed in U.S. Pat. Nos. 4,329,065 and 4,413,913 and particularly for the novel devolatilization apparatus and methods of U.S. application Ser. No. 532,166.

BRIEF SUMMARY OF THE INVENTION

The rotary processors of this invention comprise a rotatable element carrying at least two annular channels and a stationary element providing a coaxial closure surface operationally arranged with the channels to provide enclosed devolatilizing passages which provide a devolatilizing stage for the processor. Each passage of the processor includes an inlet for receiving material, an outlet for discharging processed material, and an end wall surface providing member, all associated with the stationary element. The end wall surface providing member is arranged and adapted so that material fed to the passage can be carried forward by the rotatable channel walls to the end wall surface where movement of the carried forward material is blocked and the blocked material is collected for discharge from the passage. One or more material transfer grooves are formed in the coaxial surface of the stationary element and positioned near the end wall surface providing member. These transfer grooves are designed to interconnect devolatilizing passages to that material blocked and collected in one passage can be transferred to another passage.

In one embodiment of the invention, the devolatilizing passages may include spreaders associated with the stationary element and arranged near the inlets of the passages. These spreaders are designed to block movement of material fed to the passages and to spread the material on the walls of the passage to provide thin films on the channel walls of the passage downstream of the spreaders. The spreading provides a void space downstream of the spreader and vacuum is connected to the void space to withdraw volatiles from the thin films carried by the walls.

In another embodiment of the invention the devolatilizing passages do not require spreaders. The devolatilizing passages and intra-stage transfer groove are designed and arranged to achieve a foam devolatilizing action utilizing a mass transfer mechanism involving three steps: nucleation of bubbles of volatiles within the material and unrestricted growth of the bubbles during plug-flow travel through each passage and rupture of the bubbles for release of the volatiles in non-pressurizing shearing zones within the devolatilizing stage.

The rotary processors of this invention include a novel, improved vacuum system for evacuating two or more adjacent devolatilizing passages of the processor. The novel, improved vacuum system of this invention comprises a manifold completely enclosing a relatively large opening through the stationary element and the manifold is arranged in operational communication with a vacuum source through a vacuum port. The vacuum system is designed to simultaneously evacuate the devolatilizing passages of the devolatilizing stage. The vacuum port of the vacuum system is spaced apart from the opening through the stationary element. Additionally, the vacuum port, manifold and opening are relatively large to provide sufficient cross-sectional area for vapor transfer to achieve such advantages as reduced vacuum loss, decreased pressure drop through the port and minimized orifice effect. The novel vacuum system also includes means to effectively prevent material buildup at least in the region of the opening through the stationary element and/or in the region of the vacuum port.

Details relating to novel rotary processors including the vacuum system of this invention as well as the advantages derived from such processors will be more fully appreciated from the Detailed Description of the Preferred Embodiments taken in connection with the Drawings.

BRIEF DESCRIPTION OF THE DRAWINGS

The invention will be described in connection with the attached drawings in which.

DETAILED DESCRIPTION OF THE PREFERRED EMBODIMENT

Figure 1:
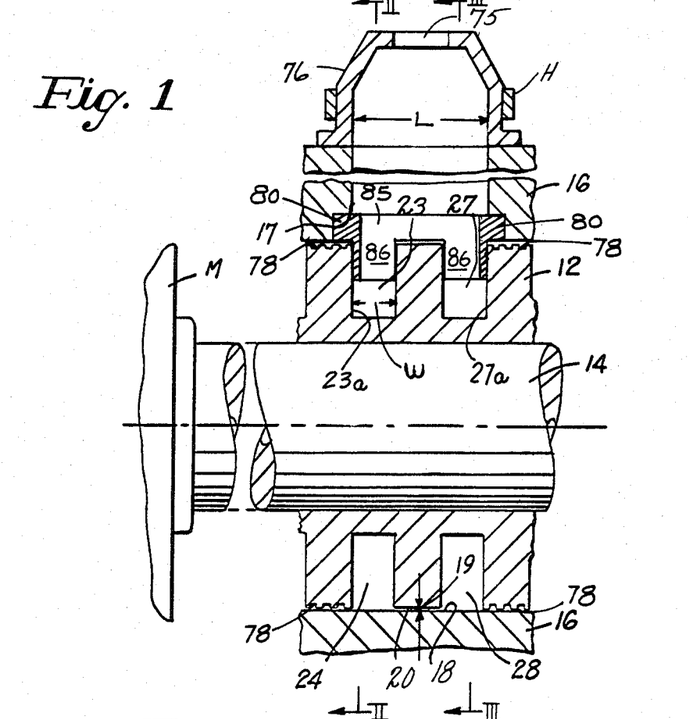
FIG. 1 is a simplified cross-sectional view of a portion of a rotary processor of the invention including the novel vacuum system.

FIG. 1 illustrates the particularly preferred rotary processor of this invention. The illustrated processor is of the type disclosed in the aforementioned U.S. patent application Ser. No. 532,166 and includes a rotatable element comprising motor 12 mounted on drive shaft 14 for rotation within a stationary element comprising housing 16. Rotor 12 carries at least two annular processing channels 23 and 27, each having opposed side walls extending forwardly from rotor surface 20. Means for rotating rotor 12 are designated M (FIG. 1), since such means are of any suitable type commonly used for rotating extruders or similar apparatus for processing viscous or plasticated materials, and are well known in the art. Housing 16 of the stationary element provides coaxial closure surface 18 cooperatively arranged with surface 20 of rotor 12 to form with channels 23 and 27 enclosed devolatilizing passages 24 and 28.

Figure 2:
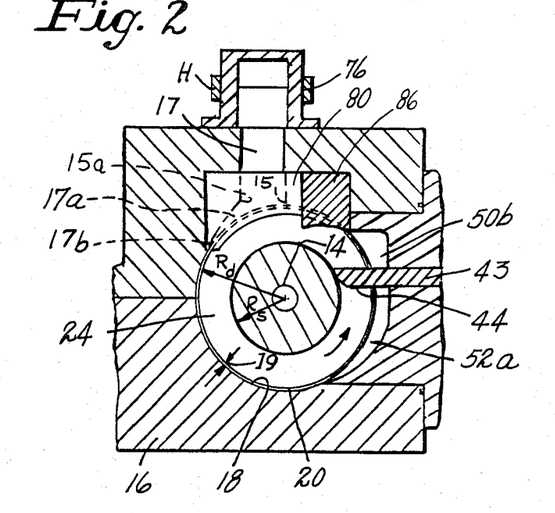
FIG. 2 is a simplified cross-sectional view of a devolatilizing passage of the rotary processor of FIG. 1, taken along line II—II of FIG. 1, and illustrating the novel vacuum system.
Figure 3:
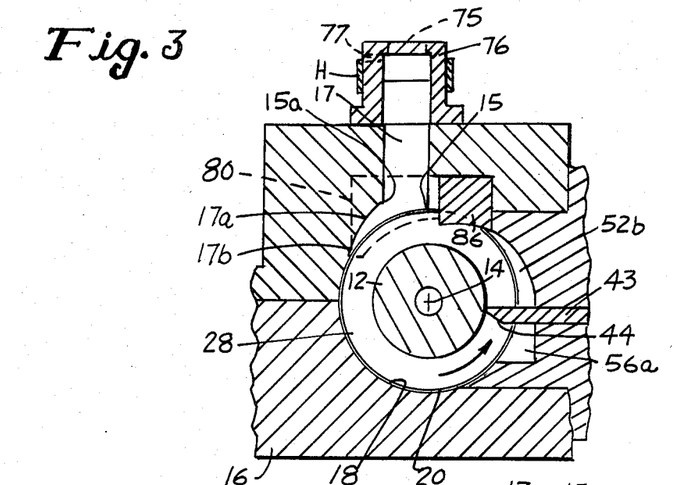
FIG. 3 is a simplified cross-sectional view of a devolatilizing passage of the rotary processor of FIG. 1 taken along line III—III of FIG. 1 and illustrating the novel vacuum system.
Figure 4:
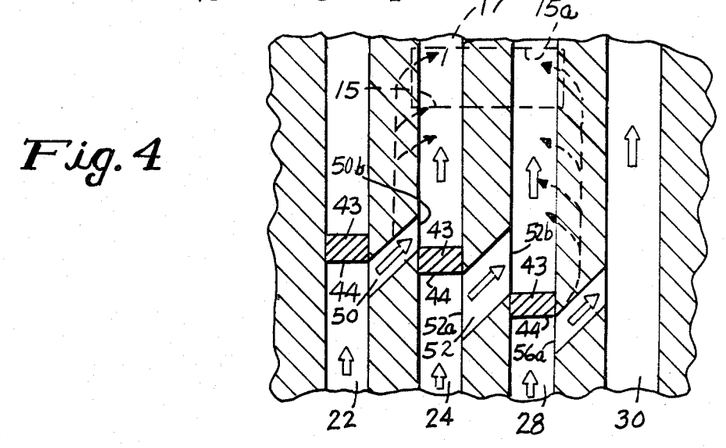
FIG. 4 is a simplified schematic view of the interconnection of the passages of FIG. 1 with each other and with upstream and downstream passages of the processor by means of transfer grooves, with larger arrows indicating the flow direction of material from one passage to another and broken arrows illustrating one potential source of material leakage.

FIGS. 2 and 3 illustrate first devolatilizing passage 24 and last devolatilizing passage 28 respectively, including inlets 50b and 52b, respectively, and outlets 52a and 56a, respectively. Inlets 50b and 52b and outlets 52a and 56a are all formed in housing 16. Passages 24 and 28 each also includes blocking member 43 which provides end wall surface 44 for each passage adjacent the outlet to collect material processed in the passage for discharge through the passage outlet. Preferably, end wall surface 44 and outlets 52a and 56a are disposed a major portion of the circumferential distance about the passage from inlets 50b and 52b. First passage 24 and last passage 28 of the processor are interconnected by transfer groove 52, as shown in FIG. 4. Transfer groove 52 provides outlet 52a of passage 24 and inlet 52b of passage 28. Transfer groove 52 is formed in closure surface 18 and arranged so that material processed in passage 24 can be transferred to passage 28 as shown by the unbroken arrows. This type of interconnection of passages is described in detail in U.S. Pat. No. 4,277,816. Transfer groove 52 also provides outlet 52a (FIGS. 2 and 4) for passage 24 and inlet 52b (FIGS. 3 and 4) for passage 28. Inlet 50b (FIGS. 2 and 4) to passage 24, and outlet 56a (FIGS. 3 and 4) from passage 28 may also be provided by transfer grooves connecting the illustrated passages with upstream and/or downstream passages of the processor. Alternatively, other forms of inlet and/or outlet arrangements may be used for the passages, such as feeding material from outside the processor directly to passage 24, or directly discharging material to outside the processor from outlet 56a of passage 28.

The devolatilizing passages shown in FIG. 1 include vacuum sealing means 78 carried on surfaces 20 of the outer walls of passages 24 and 28. The preferred seals are described in commonly owned, copending U.S. patent application Ser. Nos. 532,165 and 532,157 filed on the same day as this Application by P. S. Mehta and by P. S. Mehta and L. N. Valsamis respectively, both incorporated herein by reference. Other portions of the processor may incorporate seals (not shown) such as those described in above-referenced U.S. Pat. No. 4,300,842.

The complete devolatilizing stage illustrated in FIG. 1 shows a devolatilizing stage including two passages, the first and the last devolatilizing passages, 24 and 28 respectively. However, more than two processing passages may be provided and in this case, the passages between first (24) and last (28) devolatilizing passages are termed intermediate devolatilizing passages and are arranged so that all adjacent devolatilizing passages of the stage are connected in an in-series relationship by transfer grooves.

The novel vacuum system for the processors of this invention is illustrated in FIGS. 1-3. As shown in FIGS. 1-3, manifold 76 is secured to and extends outwardly from the external surface of housing 16 and completely encloses substantially rectangular opening 17. Opening 17 through the stationary element (housing 16) extends in the direction of rotation about a portion of the circumference of housing 16 from leading edge 15 of opening 17 to trailing edge 15a of opening 17. Opening 17 also extends axially over channels 23 and 27 as shown in FIG. 1. Accordingly, manifold 76 provides operational communication between passages 24 and 28 and a vacuum source (not shown) through vacuum port 75 (FIG. 1), for evacuation of passages 24 and 28. Vacuum manifold 76 may communicate with a vacuum measurement means (not shown) through vacuum measurement opening 77 (FIG. 3) in manifold 76. Optional drainage means (not shown) may be provided if necessary to drain condensate from manifold 76. Sealing means, such as gaskets and O-rings, are provided wherever appropriate to control vacuum leakage from manifold 76. Preferably, manifold 76 is heated by heating means H (FIGS. 1-3), such as an electric strip heater, to minimize condensation of vapors inside manifold enclosure 76.

As shown, substantially rectangular opening 17 extends axially over substantially the full width of the passages to be evacuated (FIG. 1). Also opening 17 is wide in its circumferential dimension relative to the rotor diameter (FIG. 2) and preferably, opening 17 extends at least 10° about the circumference of housing 16. The geometries of opening 17, manifold 76 and port 75 provide a substantially large cross-sectional area for especially efficient transfer of vapors from passages 24 and 28 to the vacuum source and minimize vacuum loss due to constriction of opening 17. Preferably the cross-sectional area available for vapor transfer is sufficiently large to provide vapor velocities at or below 0.2 mach.

As shown in FIG. 1, manifold 76 includes vacuum port 75 which is relatively large in diameter and spaced apart from opening 17, making possible the use of a larger vacuum line (not shown). These features reduce any undue pressure drop and provide improved control over vacuum loss such as may be encountered with small ports. In the manifold 76 illustrated in FIG. 1, vacuum port 75 is positioned at the portion of manifold 76 furthest removed from passgages 24 and 28. Alternatively, port 75 may be positioned at the side portions of manifold 76 and more than one vacuum port may be used.

This combination of a large opening 17 through housing 16 enclosed by a large vacuum manifold 76 including a relatively large port 75 as illustrated in FIGS. 1 to 3 provides especially effective evacuation of the devolatilizing passages of the rotary processor. These especially effective evacuation performance characteristics are assured by including means which can effectively prevent leakage of material into the devolatilizing passages and to effectively prevent material buildup within the devolatilizing passages.

Figure 5:
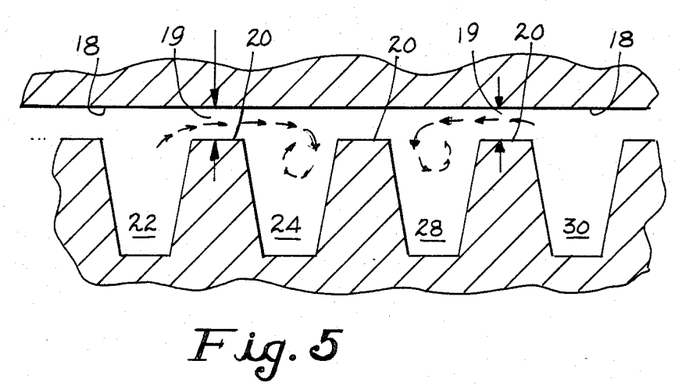
FIG. 5 is a simplified cross-sectional vie of a portion of the rotary processor of FIGS. 1-4 illustrating the phenomenon of barrel hangings.

The structural and operational characteristics of devolatilizing passages present conditions which can provide for leakage of material into the devolatilizing passages and a peculiar and undesirable build-up of material within the devolatilizing passages. FIG. 5 illustrates in simplified fashion manners in which this leakage and peculiar build-up of material can occur in devolatilizing passages. FIG. 5 illustrates in simplified form an arrangement of processing passages formed by channels carried by rotor 12 and closure surface 18. The passages shown include a devolatilizing stage (passages 24 and 28) with a feed passage 22 for feeding melted material to the devolatilizing stage and a passage 30 for receiving melted material processed in the devolatilizing stage. The feed and receiving passages 22 and 30 are usually substantially full of melted material and significantly high pressures are generated in both the feed and receiving passages while the devolatilizing passages are maintained only partially full and under vacuum. Because of the differential in pressures, material from the feed and receiving passages can be urged or forced into clearance 19 between rotor surface 20 and closure surface 18 as shown by the arrows. Material which moves into clearance 19 can be forced or pulled into passages 24 and 28 and into opening 17 of the vacuum system or the material can be deposited on portions of stationary closure surface 18 of the passage. Once material is deposited in the portions of surface 18 enclosing the passages, it cannot be dragged forward by the rotating channel walls and therefore remains deposited on surface 18. As more material is forced between clearance 19 and into the passages, the material continues to accumulate on material already deposited on surface 18. The accumulated material remains attached to and at some points about the circumference can suspend from surface 18 taking the form shown in FIG. 5, in which the accumulated material attached to surface 18 extends away from surface 18 into the passages. Some of the accumulated material will break off intermittently during operation and can fall gravitationally or be pulled into the passage to be carried forward for discharge from the passage. Additionally, some of this material can undergo degradation due to the increase in residence time in the processor, and can contaminate the main body of material.

These accumulations of material attached to and suspended from surface 18 and extending into the devolatilizing passages have been denoted "barrel hangings". Theoretically, the phenomenon of barrel hangings occurring under the conditions described above can occur at any point about the circumference of the first and last devolatilizing passages between the inlet and the outlet because of the pressure differential in the passages adjacent them. However, sealing means such as 78 in FIG. 1 are normally employed to control leakage of material to the first and last devolatilizing passages and to control the vacuum level in the devolatilizing passages. These sealing means function effectively about a major portion of the circumference of the passages but extremely high pressures can be generated in certain circumferential portions of the devolatilizing passages which can lead to leakage of material into clearance 19.

FIG. 4 illustrates a particular potential for the formation of barrel hangings which can be encountered at the inlet region of a first devolatilizing passage 24. In normal operations, pressure in feed passage 22 increases progressively about the circumference of the passage. Maximum pressure is achieved at end wall blocking surface 44 to effectively discharge melted material from the feed passage to first devolatilizing passage 24 through transfer groove 50. Additionally, means to control the feed of material (not shown) to passage 24 may generate high pressures in this region. Because of the high pressures generated at transfer groove 50, amounts of material can be forced into clearance 19 from transfer groove 50 as shown by the broken arrows. The material forced into clearance 19 is dragged forward by rotating surface 20 and, as shown by the broken arrows, is drawn into first devolatilizing passage 24 because of the vacuum level in passage 24. The material drawn into passage 24 can attach to closure surface 18 and as more material is forced into clearance 19 and dragged forward by rotating surface 20, the material accumulates on the attached material to provide barrel hangings which extend into passage 24. Also, as shown by the broken arrows, some of the leakage material in clearance 19 can be dragged forward and drawn into passage 24 in the region of opening 17 resulting in entrainment and possible vacuum line plugging. This potential for leakage of material in the inlet region is particularly encountered in the first devolatilizing passage of the devolatilizing stages disclosed and claimed in above-referenced U.S. patent application Ser. No. 532,166.

Substantially the same situation for leakage of material into clearance 19 exists at the outlet region of passage 28 (as shown by the broken arrows in FIG. 4) where high pressures are normally generated for discharge of material from the passage by the cross-sectional size of outlet 56a or by other means (not shown) to control the discharge of material from passage 28.

Figure 6:
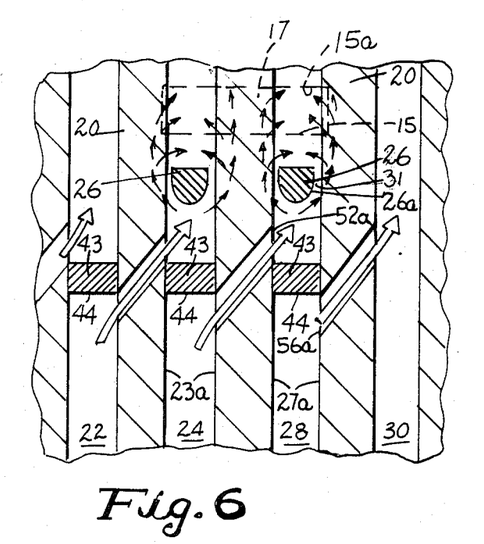
FIG. 6 is a simplified schematic view of the interconnection of passages of an alternate embodiment of a rotary processor of the invention by means of transfer grooves, with larger arrows indicating the flow direction of material from one passage to another and broken arrows illustrating another potential source of leakage.

FIG. 6 illustrates another potential cause of barrel hangings which is particularly encountered in devolatilizing passages disclosed and claimed in U.S. Pat. No. 4,329,065. As shown, first and last devolatilizing passages 24 and 28 respectively are evacuated through opening 17 and are arranged between feed passage 22 and receiving passage 30. The pressures in passages 22 and 30 are significantly higher than the pressures in devolatilizing passages 24 and 28. Devolatilizing passages 24 and 28 include spreaders 26 arranged near inlets 50a and 52a of passages 24 and 28. Spreaders 26 are associated with stationary surface 18 (not shown) and extend radially into passages 24 and 28 to provide close clearances, as 31, between side walls 26a of spreaders 26 and the inner channel wall surfaces 23a and 27a of passages 24 and 28. Material fed to passages 24 and 28 is blocked by surfaces 29 of spreaders 26, spread on the moving channel wall surfaces and is dragged past spreaders 26 as thin layers to provide void spaces downstream of spreaders 26 in the direction of rotation of the channel wall surfaces.

Extremely high pressures can be built up at surfaces 29 of spreaders 26 and material can be forced into clearance 19 as shown by the broken arrows and carried forward by rotating surfaces 20 beyond spreader 26. The material carried forward by surfaces 20 can be forced or drawn into passages 24 and 28 because of the vacuum level in these passages. As shown by the broken arrows, material forced or drawn into devolatilizing passages 24 and 28 from surfaces 20 can attach to portions of closure surface 18 (not shown) enclosing the void space and additional material dragged forward by surfaces 20 can accumulate on the attached material to establish barrel hangings in the passage. As also shown by the broken arrows, some of the leakage material can be forced or drawn into the passage in the region of opening 17.

Material leakage and buildup of leakage material in devolatilizing passages as barrel hangings presents an operational problem which must be avoided or minimized for maximized processing efficiency. As described above, the residence time in the passage of material accumulated as barrel hangings is increased and the increased residence time can effect the quality of the processed product. Additionally, barrel hangings can cause instability (flow fluctuations) in the output of the passage. Equally important, any leakage of material into the first and last processing passages in the region of opening 17 and vacuum port 75 presents a serious potential for entrainment and vacuum line plugging.

In accordance with the present invention, circumferential ribs 80 effectively prevent leakage of material in the region of the vacuum port. As shown in FIGS. 1, 2 and 3, circumferential ribs 80 are arranged and positioned at the peripheral regions of the devolatilization stage adjacent walls 23a and 27a (FIG. 1). Circumferential ribs 80 are securely fixed to stationary closure surface 18 and extend over a portion of surface 20 adjacent channel walls 23a and 27a. Ribs 80 form an extension of closure surface 18 and also extend radially into channels 23 and 27 to provide a close clearance 32 (FIGS. 7 and 7a) between the radially extending portions of ribs 80 and walls 23a and 27a. As shown in FIGS. 2 and 7a, rib 80 is arranged and positioned in passage 24 to extend in the direction of rotation of rotor 12 from a point at or near inlet 50b to a point at or beyond trailing edge 15a of opening 17. As shown in FIG. 3, circumferential rib 80 is arranged and positioned in passage 28 to extend in the direction of rotation of rotor 12 from a point at or near blocking member 43 to a point at or beyond trailing edge 15a of opening 17. The arrangement of circumferential ribs 80 shown in FIGS. 2, 3 and 7a effectively prevents barrel hangings from forming on that portion of surface 18 upstream of opening 17, i.e. that portion of surface 18 between inlets 50b and 52b of passages 24 and 28 and leading edge 15 of opening 17. Material built up on that portion of surface 18 presents an especially serious potential for plugging of opening 17 or vacuum port 75. Additionally, since circumferential rib 80 extends beyond trailing edge 15a of opening 17, material leakage from clearance 19 is also effectively prevented from entering opening 17. Accordingly, circumferential ribs 80 constitute an important, integral part of the vacuum system of this invention and cooperate to effectively prevent and control leakage and buildup of material in the devolatilizing passages to thereby effectively maximize the overall reliability and efficiency of the vacuum system.

Figure 7:
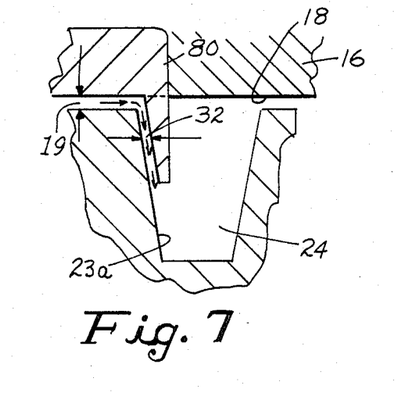
FIG. 7 is a simplified cross-sectional view of the devolatilizing passage of FIG. 1, illustrating means to control leakage of material into the passage.
Figure 7A:
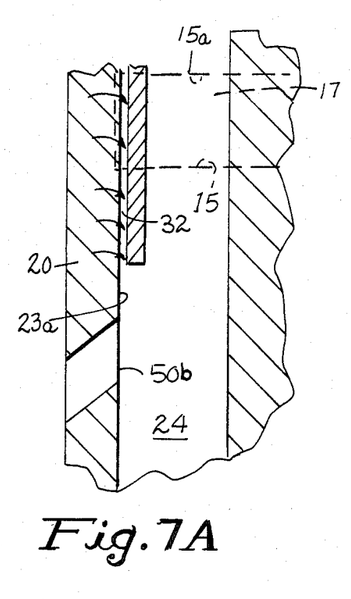
FIG. 7a is a simplified plan view of the passage of FIG. 7, illustrating means to control leakage of material into the passage.

The achievement of effectively preventing and controlling leakage and buildup of material by circumferential ribs 80 in the region of opening 17 or port 75 is best illustrated in FIGS. 7, 7a, 8 and 8a. FIGS. 7 and 7a illustrate the performance of rib 80 in passage 24 when no spreader is utilized. As mentioned, rib 80 is arranged in passage 24 to provide a clearance 32 which extends from a point at or near inlet 50b (FIGS. 2 and 7a) to a point at—or preferably beyond—edge 15a of opening 17 (FIGS. 2 and 7a). As shown by the arrows of FIGS. 7 and 7a, material forced into clearance 19 between surfaces 18 and 20 and carried forward by rotating surface 20 is prevented from contacting and being deposited on that portion of surface 18 upstream of opening 17 which encloses passage 24. As the material in clearance 19 is moved toward that portion of surface 18 enclosing passage 24 or toward opening 17, circumferential rib 80 diverts the moving material to clearance 32 between wall 23a and rib 80. The material diverted to clearance 32 is either discharged into passageway 24 from clearance 32 in the region of rib 80 or the material may be carried forward by rotating wall 23a for discharge downstream of rib 80. Accordingly, barrel hangings are effectively prevented in that portion of surface 18 enclosing passage 24 which extends from inlet 50b to edge 15 of opening 17 to thereby effectively eliminate the potential for plugging of opening 17 or port 75 by barrel hangings. Additionally, circumferential rib 80 extends beyond edge 15a of opening 17 and therefore effectively prevents leakage material carried to the region of opening 17 from contacting opening 17 or port 75. Clearance 32 can be constant along the entire length of rib 80 or the clearance can vary. Preferably, clearance 32 should be between 0.01 in. to 0.25 in. Normally rib 80 extends radially into passage 24 (or 28) no more than about one-half the depth of channel 23 and usually less than one-fourth of the depth.

While the above description has been directed to circumferential rib 80 arranged adjacent channel wall 23a of passage 24, the same effect is achieved with the circumferential rib 80 arranged adjacent channel wall 27a of passage 28.

As mentioned above, the potential for material buildup or material leakage through clearance 19 can exist about the entire circumference of the first and last devolatilizing passages. Accordingly, circumferential rib 80 can extend about substantially the entire circumference of channel walls 23a and 27a. Under most conditions, however, the sealing means 78 (FIG. 1) can effectively control leakage of material about the major circumferential portions of the first and last devolatilizing passages. Maximized efficiency and reliability of the vacuum system of the invention is usually assured if rib 80 extends at least about the circumferential portions of first and last devolatilizing passages 24 and 28 which extend at least from a point at or upstream of leading edge 15 in each passage to a point at or beyond trailing edge 15a of opening 17.

Figures 8, 8A:
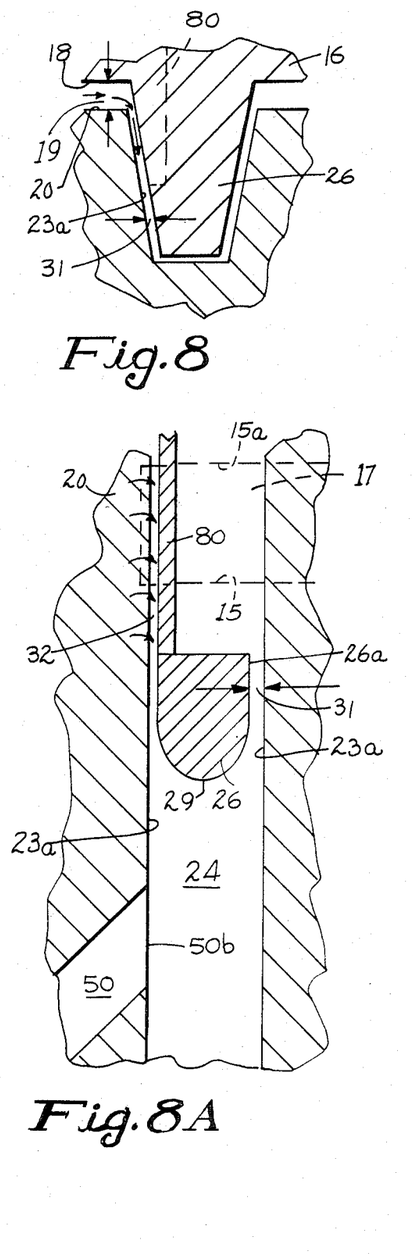
FIG. 8 is a simplified cross-sectional view of a devolatilizing passage of FIG. 6 illustrating means to control leakage of material into the passage.
FIG. 8a is a simplified plan view of the passage of FIG. 8, illustrating means to control leakage of material into the passage.

FIGS. 8 and 8a illustrate the use of circumferential ribs in devolatilizing passages of the type described in U.S. Pat. No. 4,329,065. For illustrative purposes, only the arrangement of circumferential rib 80 in first devolatilizing passage 24 is shown. However, the description applies equally to the arrangement of circumferential rib 80 in the last devolatilizing passage. It will be noted from FIG. 6 that the pressure buildup at spreaders 26 can force material into clearances 19 existing between surfaces 20 and 18 which separate passages 22 and 24, between surfaces 20 and 18 separating passages 24 and 28 and between surfaces 20 and 18 separating passages 28 and 30. However, significant leakage of material carried by surfaces 20 occurs only between passages having differential pressures e.g. between passages 22 and 24 and between passages 28 and 30. Material carried by surface 20 between passages 24 and 28 of the devolatilizing stage has not presented a significant problem of plugging of opening 17 or port 75. As shown in FIGS. 8 and 8a, passage 24 includes spreader 26 which is associated with stationary element 16 and positioned near inlet 50b provided by transfer groove 50. Spreader 26 extends radially into passage 24 and terminates short of the channel root, conforming closely in cross sectional dimensions and shape to the cross sectional dimensions and shape of the channel to provide clearance 31 between sides 26a of spreader 26 and channel walls 23a. Upstream surface 29 of spreader 26 is designed to block movement of material fed to passage 24 and to spread the blocked material on the channel walls. Material spread on the walls is carried forward by the walls as thin layers and a void space is provided at or near the downstream surface of spreader 26. A vacuum source is arranged to communicate with the void space through opening 17 in the manner shown in FIGS. 1-3.

Circumferential rib 80 is securely fixed to stationary closure surface 18 and extends over a portion of surface 20 adjacent passage 24. Rib 80 extends radially into the channel and provides close clearance 32 (FIG. 8a) with wall 23a. As shown in FIG. 8a, rib 80 is arranged in passage 24 to extend in the direction of rotation of the walls from a point at the downstream surface of spreader 26 to a point at or beyond edge 15a of opening 17. As shown by the arrows, rib 80 effectively prevents material forced into clearance 19 and carried forward by surface 20 from reaching that portion of closure surface 18 of passage 24 which extends from the downstream surface of spreader 26 to edge 15a as well as effectively preventing the material from reaching opening 17.

In the preferred vacuum system of the invention, further control of material buildup at or near opening 17 may be achieved by providing undercut 17a (FIGS. 2 and 3). Undercut 17a is formed in surface 18 and preferably extends over or coincides with the full width of opening 17. Undercut 17a provides an effective control for any material buildup at edge 15a which could occur if edge 15a were arranged so that material carried for example by surface 20 separating passages 24 and 28 of FIG. 6 could be scraped off and collected at edge 15a. In the preferred embodiments of this invention, the circumferential ribs extend to a point at or beyond the most downstream edge 17b of undercut 17a to redirect material collected in undercut 17a into the devolatilizing passages.

The vacuum system of this invention is particularly adaptable for use in combination with devolatilization stages described and claimed in above-referenced U.S. patent application Ser. No. 532,166. Devolatilization passages of that application do not require spreaders as in the devolatilization passages of U.S. Pat. No. 4,329,065. As described in U.S. Pat. No. 4,329,065, the spreaders provide thin layers of material which are carried on the channel walls through void spaces which are provided downstream of the spreader. A vacuum source is connected to the void space. Essentially, the mass transfer mechanism for achieving devolatilization in the passages of U.S. Pat. No. 4,329,065 involves diffusion of volatiles from the film surfaces during exposure to vacuum. In turn, this mechanism is dependent on and/or influenced by such factors as the effective volatile diffusivity, the film thickness and the time of exposure to vacuum.

The mechanism involved in achieving devolatilization in the passages of U.S. application Ser. No. 532,166 is significantly different from that involved in U.S. Pat. No. 4,329,065. Essentially, the mechanism involves three steps: (1) nucleation of bubbles of volatile material within the processing material, (2) growth of the bubbles and (3) rupture of the bubbles. This mechanism does not require spreading of the material on the channel walls as thin layers, but nevertheless provides extremely efficient mass transfer of volatiles from processing materials including viscous, viscoelastic materials. Essentially, the mechanism is achieved by a distinctive integration of features including control of the processing volume available within the devolatilizing stage passages and control of the transfer volume available within the transfer grooves interconnecting passages of the stage. The integrated control of these features provides a devolatilizing stage arrangement which may be coordinated with the processing rate, the vacuum level and the characteristics of the material being processed. This coordination results in an especially efficient and dynamic foam devolatilization action in which material fed to each devolatilizing passage immediately undergoes significant expansion in volume and foaming because of extremely rapid bubble nucleation and growth at or very near the feed inlet. Some of these bubbles may be ruptured almost immediately on formation, releasing volatiles from the material to be withdrawn by the vacuum. In operation, the material is carried through each passage in a substantially plug-flow fashion in the form of a substantially continuous strand or as discontinuous chunks of material.

The significant expansion in volume and/or foaming of the strand or chunks of material which occurs at or near the inlet in the apparatus of application Ser. No. 532,166 presents a potential for entrainment and plugging of opening 17 and/or port 75. As shown in FIGS. 1-3, circumferential flow diverters 86 are associated with the stationary element and arranged and positioned between inlets 50a and 52a of passages 24 and 28 and opening 17. Flow diverters 86 extend radially downward into each passage and are shaped and dimensioned to direct the flow of the expanding and/or foaming strand-like material to the root of the channel and away from opening 17. Usually flow diverters 86 extend radially into each passage less than about one-half the depth of the passage. Flow diverters 86 differ significantly from spreaders of devolatilization apparatus described in U.S. Pat. No. 4,329,065. Flow diverters 86 are not designed to spread material on the channel walls as thin films. Instead they are designed to direct flow of the strand-like material to the root of the passage and to accomplish this function without developing any significant pressure increase in the inlet region where the flow diverters 86 are positioned. Flow diverters 86 also prevent any material collected on surface 18 near the inlets of each passage from being drawn into opening 17 by the vacuum pressure. Accordingly, flow diverters 86 provide additional control to prevent material from plugging opening 17 or vacuum port 75. The flow diverters illustrated in FIGS. 1-3 are all provided by flow diverter unit 85 (FIG. 1). However, separate flow diverters may be provided for each devolatilizing passage if desired.

FIGS. 9-15 illustrate a single devolatilizing stage of a multi-stage rotary processor utilizing the vacuum means of this invention. As illustrated schematically in FIG. 10, the passages are interconnected by material transfer grooves (formed in surface 218 of housing 216) arranged so that material in one passage can be transferred to an adjacent passage. The transfer grooves and the inlets and outlets associated therewith, as well as the blocking members, described below, may be provided by one or more removable transfer plates associated with housing 216, as described in commonly owned U.S. Pat. No. 4,227,816.

Figure 9:
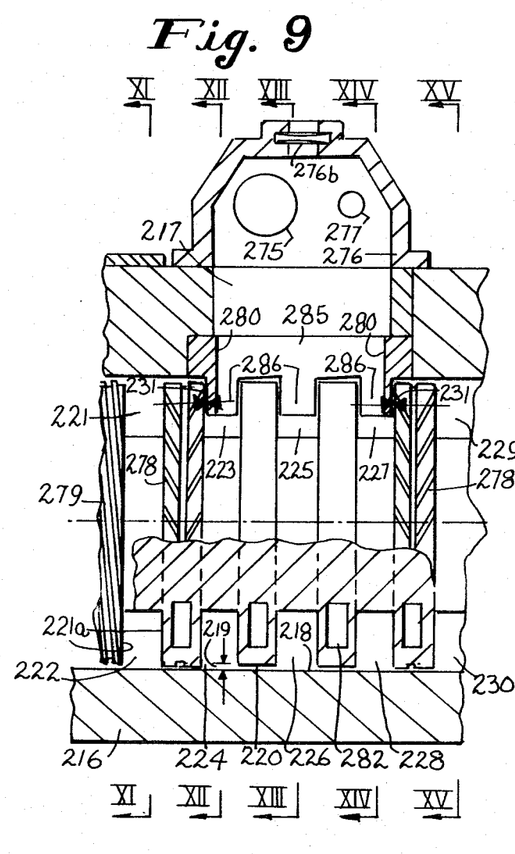
FIG. 9 is a simplified partial cross-sectional view of a multistage rotary processor showing a preferred arrangement of processing passages and illustrating the novel vacuum system.

As illustrated in FIG. 9, the devolatilizing stage communicates with vacuum manifold 276 through opening 217 which extends through housing 216. Opening 217 extends over adjacent devolatilizing passages 224, 226 and 228. The positioning of vacuum manifold 276 and opening 217 about the circumference of the passages is most clearly shown in FIGS. 10 and 12-14. Vacuum manifold 276 provides operational communication between the passages of the devolatilizing stage and a vacuum source (not shown) through vacuum port 275 (FIG. 9) for the evacuation of the passages. Thus passages 224, 226 and 228 of the devolatilizing stage are evacuated through opening 217 and vacuum manifold 276. As shown in FIG. 9, vacuum manifold 276 may communicate with a vacuum measurement means (not shown) through vacuum measurement opening 277 in manifold enclosure 276a. In the preferred rotary processor shown in FIG. 9, a viewing port such as sight glass 276b is mounted on manifold 276 and is positioned on a plane substantially perpendicular to the radius of the passages. Sight glass 276b permits viewing of the devolatilizing stage during operation. Preferably manifold 276 is heated by heating means H (FIGS. 12-14) in a manner similar to that shown in FIGS. 1 and 2, to minimize condensation of vapors in the manifold enclosure.

As shown in FIG. 9, surface 220 of rotor 212 is spaced apart from surface 218 of housing 216 by close clearance 219. To control vacuum leakage in the devolatilizing stages, rotor surfaces 220 between passages of differing pressure levels are provided with sealing means, such as seals 278, shown in FIG. 9 between passages 222 and 224 and 228 and 230. These seals are described in detail in above referenced application Ser. Nos. 532,165 and 532,157. Seals are not shown between channels at the same pressure level, but could be provided if desired.

The vaporization of the volatiles in the material tends to lower the temperature of the material. Accordingly, the devolatilizing efficiency of the processor may be increased by providing heating means to heat at least the side walls of the devolatilizing channels, and preferably all the channels as well as the housing of the processor. Heating means 282 illustrated in FIG. 9 is a series of chambers through which heat transfer fluid may be circulated in a known manner, but any suitable means to maintain the temperature of the material during processing may be used.

Figure 10:
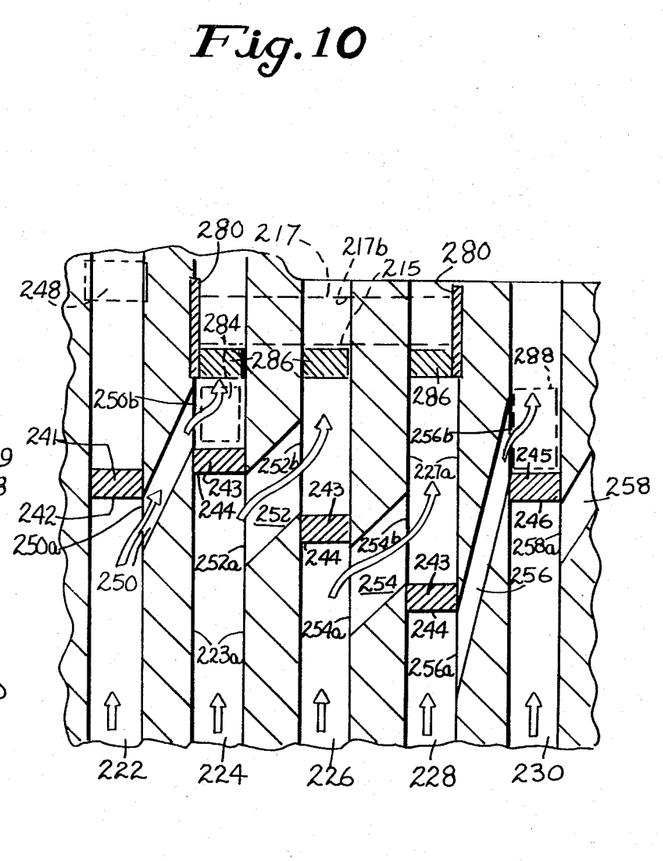
FIG. 10 is a simplified schematic view of the interconnection of the passages of FIG. 9 by means of transfer grooves with arrows indicating the flow direction of material from one passage to another.
Figure 11:
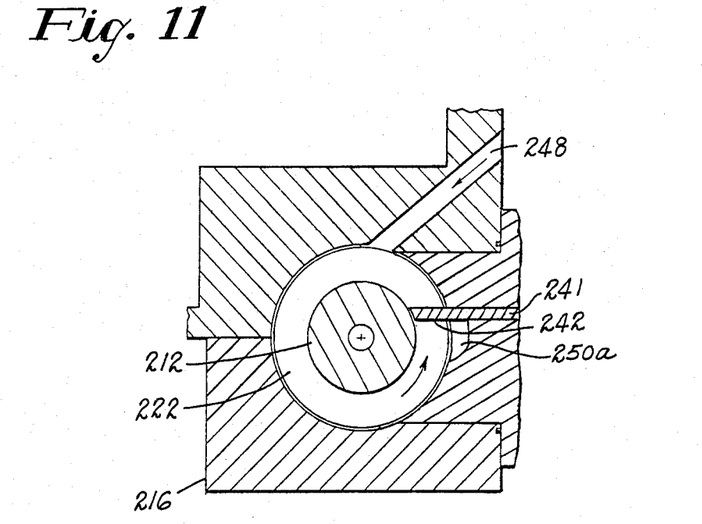
FIG. 11 is a simplified cross-sectional view of a feed passage of the arrangement of passages shown in FIG. 9 taken along line XI—XI of FIG. 9.
Figure 12:
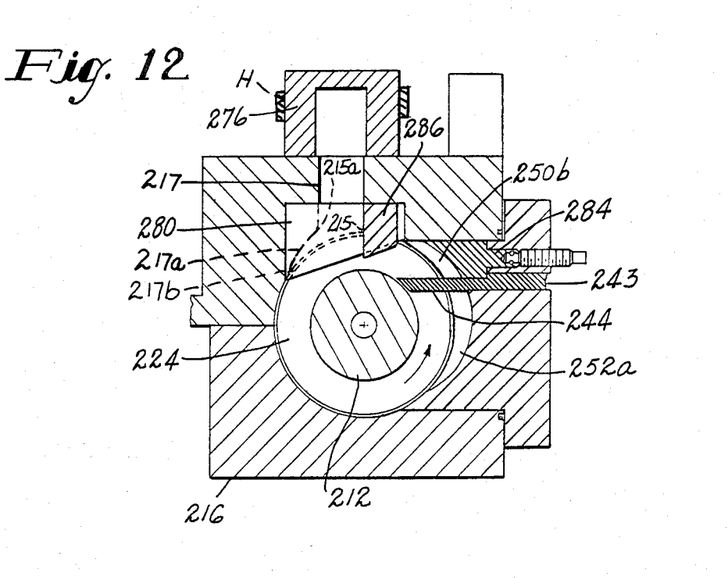
FIG. 12 is a simplified cross-sectional view of a first devolatilizing passage of the arrangement of passages of FIG. 9 taken along line XII—XII of FIG. 9.

FIGS. 9-11 illustrate passage 222 of the feed stage, described in detail in application Ser. No. 532,166, mentioned above. In operation, liquid material is supplied gravitationally or by forced feeding to the processor by inlet 248 (FIGS. 10-11), is received into channel 221, and is dragged forward by rotating walls 221a (FIG. 9). At end wall surface 242, the material is collected for discharge through outlet 250a and transferred to the devolatilizing stage by way of transfer groove 250, which provides outlet 250a for passage 222 and inlet 250b for passage 224, the first passage of the devolatilizing stage, as shown in FIGS. 10 and 12.

FIGS. 9, 10 and 12-14 illustrate the first, intermediate and last devolatilizing passages respectively of the devolatilizing stage, each communicating with vacuum manifold 276. First devolatilizing passage 224 (FIG. 12) includes inlet 250b and outlet 252a, both formed in housing 216. Intermediate devolatilizing passage 226 (FIG. 13) includes inlet 252b and outlet 254a, both formed in housing 216. Last devolatilizing passage 228 (FIG. 14) includes inlet 254b and outlet 256a, also formed in housing 216. Outlets 252a, 254a and 256a are preferably spaced apart from the inlets a major portion of the circumferential distance about the devolatilizing passages. Each devolatilizing passage (FIGS. 12-14) includes end wall surface 244 provided by blocking member 243 (associated with housing 216) and arranged near the passage outlet to collect material processed in the passage for discharge from the passage. Inlet 250b of first devolatilizing passage 224 and outlet 256a of last devolatilizing passage 228 provide the inlet and outlet respectively of the devolatilizing stage.

As illustrated schematically in FIG. 10, passages 224, 226 and 228 form a complete devolatilizing stage and are interconnected by transfer grooves 252 and 254 (formed in surface 218 of housing 216), and are arranged so that material processed in passage 224 can be transferred to passage 226 and subsequently to passage 228 for further devolatilizing. Transfer groove 252 provides outlet 252a for passage 224 and inlet 252b for passage 226; transfer groove 254 provides outlet 254a for passage 226 and inlet 254b for passage 228, as best shown in FIG. 10. In the preferred embodiment shown in FIG. 10, transfer groove 256 interconnects passage 228 and passage 230 of the mixing stage, and provides outlet 256a for discharging material from the devolatilizing stage. Transfer grooves 250 and 256 for feeding and discharging material to and from the devolatilizing stage are also formed in surface 218 of housing 216.

The devolatilizing stage is characterized by design features which permit efficient devolatilization of viscous—including viscoelastic—materials as described in detail in above-referenced application Ser. No. 532,166. These features provide effective removal of volatiles from material processed in the devolatilizing stage by way of a foam devolatilization mechanism involving three steps: nucleation of bubbles containing the volatiles, growth of the bubbles, and rupture of the bubbles in non-pressurizing shearing zones, as described in detail in application Ser. No. 532,166. Volatiles released by bubble rupture are continuously removed from the passage through large vacuum opening 217 and vacuum manifold 276, so that a low pressure level is maintained to promote continued growth of bubbles and to prevent redissolution of volatiles into the material.

Inlet 250b, illustrated in FIGS. 10 and 12 is relatively narrow in cross section, and is designed to provide control of the inlet pressure and vacuum sealing of the devolatilizing stage. Further precise control of the inlet pressure and vacuum sealing may be achieved by providing control gate 284 at inlet 250b of the first devolatilizing stage (FIG. 12). Control gate 284 may be arranged to be adjustable from outside the processor and constricts inlet opening 250b to a preselected degree, as is described in further detail in above-referenced application Ser. Nos. 532,116; 532,165 and 532,157.

As best shown in FIG. 10, rib 280 is arranged and positioned in passage 224 adjacent wall 223a providing clearance 231 (FIG. 9) and extends from a point at inlet 250b to a point beyond edge 217b (FIG. 12) of opening 217. Another rib 280 is arranged and positioned in passage 228 adjacent wall 227a providing clearance 231 (FIG. 9) and extends from a point near inlet 254b upstream of edge 215 of opening 217 to a point beyond edge 217b of opening 217. In this way, leakage of material in clearance 219 carried forward by rotating surface 220 between passages 222 and 224 and between passages 228 and 230 is effectively prevented from entering opening 217 thereby essentially eliminating plugging of opening 217 or port 275. Also, flow diverters 286 (FIGS. 9, 10 and 12-14) are provided in each devolatilizing passage to direct material entering the passage to the root of the passage to provide additional protection preventing material from entering or accumulating at opening 217. Undercut 217a (FIGS. 12, 13 and 14) in closure surface 218 provides control of material build-up at edge 215a of opening 217. The illustrated flow diverters 286 are part of flow diverter unit 285 (FIG. 9), but separate flow diverters may be used for each devolatilizing passage.

Transfer groove 256 (FIG. 10) is relatively narrow in cross-section and is designed to provide control of the outlet pressure and vacuum sealing of the first devolatilizing stage. Further precise control of the outlet pressure and vacuum sealing may be achieved by providing control gate 288 (FIG. 15) at inlet 256b of mixing passage 230, which is similar to control gate 284, described above. Control gate 288 is described in further detail in above-referenced application Ser. Nos. 532,166; 532,165 and 532,157.

Figure 13:
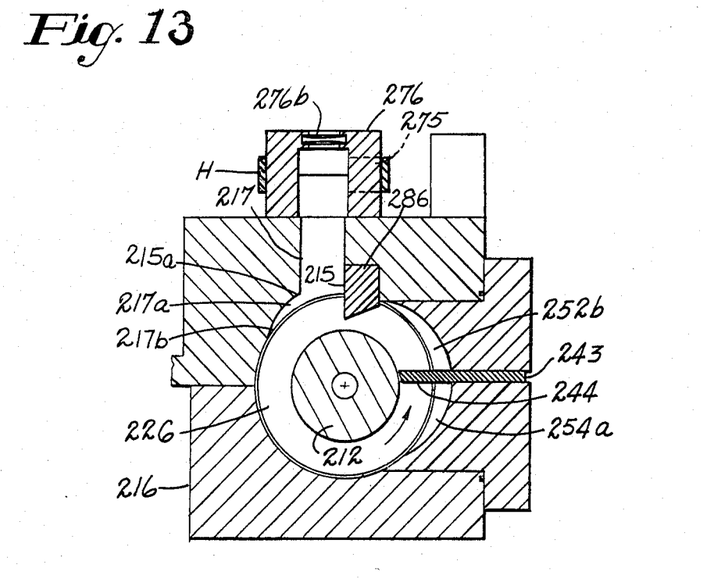
FIG. 13 is a simplified cross-sectional view of a intermediate devolatilizing passage of the arrangement of passages of FIG. 9 taken along line XIII—XIII of FIG. 9.

In operation, liquid material enters devolatilizing passage 224 of the devolatilizing stage at inlet 250b at a pressure controlled by the geometry of inlet 250b and by inlet control gate 284 (FIGS. 10 and 12), and is directed toward the root of channel 223 by flow diverter 286. The material is exposed to a vacuum drawn through vacuum manifold 276, causing flash foaming within the first devolatilizing passage as bubbles of volatiles form and grow in size. At end wall 244, non-pressurizing shearing is induced in the collected material rupturing the bubbles. The material is discharged through outlet 252a for transfer through transfer groove 252 to intermediate devolatilizing passage 226 (FIGS. 10 and 13).

Figure 14:
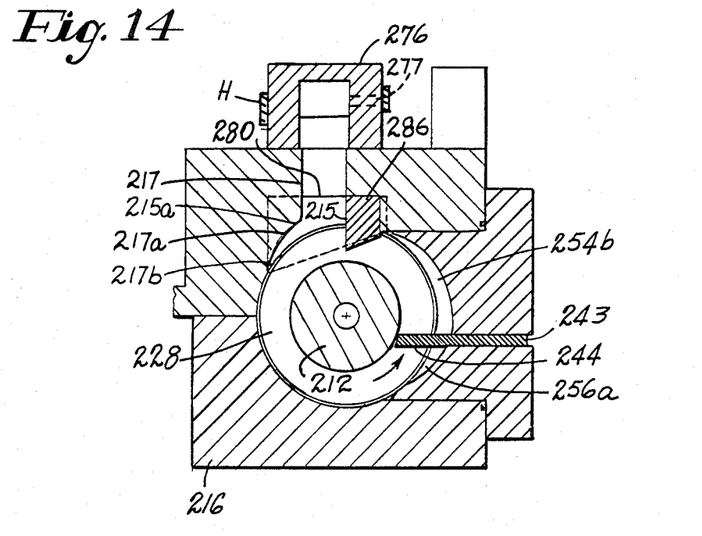
FIG. 14 is a simplified cross-sectional view of a last devolatilizing passage of the arrangement of passages of FIG. 9 taken along line XIV—XIV of FIG. 9.

From transfer groove 252, material enters intermediate devolatilizing passage 226 through inlet 252b (FIGS. 10 and 13), is directed toward the root of the channel by flow diverter 286, is exposed to vacuum and is carried forward to end wall 244 for non-pressurizing shearing and discharge through outlet 254a. Material passes through transfer groove 254 (FIG. 10), entering last devolatilizing passage 228 through inlet 254b and is directed toward the channel root by flow diverter 286 (FIG. 14). The foamed material is carried through passage 228 toward end wall 244.

Figure 15:
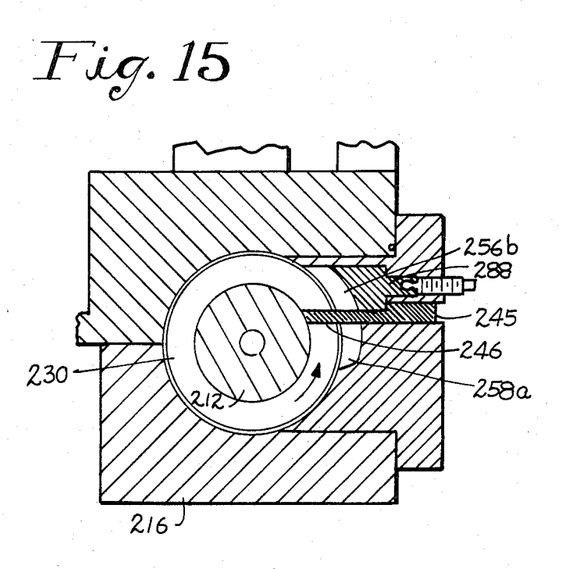
FIG. 15 is a simplified cross-sectional view of a receiving passage of the arrangement of passages of FIG. 9 taken along line XV—XV of FIG. 9.

As the material is carried through and transferred between the devolatilizing passages, it is continually subject to vacuum and does not undergo any substantial increase in pressure. Accordingly, bubbles of volatiles continue to nucleate within the material, grow and rupture as described in application Ser. No. 532,166 until the material approaches end wall 244 of last devolatilizing passage 228. The volatiles released by the rupture of the bubbles are withdrawn through opening 217, which communicates with all of the passages of the devolatilizing stage. As shown in FIGS. 10, 12 and 14, circumferential ribs 280, arranged in passages 224 and 228 prevent leakage carried forward by rotating surface 220 between passages 222 and 224 and between passages 228 and 230 from entering opening 217 in the manner described. Flow diverters 286 and undercut 217a cooperate to effectively prevent material from entering opening 217 and/or port 275. Sufficient pressure is generated within the material collected at end wall 244 of last devolatilizing passage 228 to discharge the material through relatively narrow outlet 256a for transfer through transfer groove 256 (FIG. 10) to passage 230 of the mixing stage (FIG. 15). The devolatilizing stage described above has three devolatilizing passages interconnected by transfer grooves, but more or fewer passages may be provided, depending on processing conditions and the material being processed.

EXAMPLE

An operational rotary processor of the type described above was used to devolatilize various polymeric materials containing volatile materials having initial volatile concentrations between about 550 ppm to about 1.4%. The processor included a rotor having a radius $R_d$ (as in FIG. 2) of 3.75 in. and carrying a single devolatilizing stage of five devolatilizing channels each having a width W (as in FIG. 1) of 0.6875 in, and a pumping stage. The channel root radius $R_s$ (as in FIG. 2) of the devolatilizing channels was 2.125 in.; that of the pumping channel was 2.625 in. The feed rate was controlled by an extruder which force-fed the material to the inlet of the devolatilizing stage at 100 lb/hr. The temperature of the materials was maintained at 350° F. to 550° F.

The vacuum system arranged with the devolatilizing stage included a manifold having a width (L, FIG. 1) of 6.5 in. and, including a 10° undercut as described above, extended over 30° of the circumference of all devolatilizing passages to completely enclose the rectangular opening through the stationary element. The diameter of the vacuum port was 1.5 in. NPT and the port was connected to a 100 cfm Stokes (Pennwalt) vacuum pump, Model No. 149HS. A flow diverter was arranged in the inlet region of each devolatilizing passage of the stage. Each flow diverter had a circumferential length of about 1.5 in. and extended radially into the passage channel about 1 inch. Circumferential ribs were arranged in the first and last devolatilizing passages. Each rib provided a clearance of 0.010 to 0.25 in. with the adjacent channel wall and extended radially into the passage channels about 0.5 in. Each rib extended at least 43° about the circumference of the passages in the direction of rotation from a point at the most upstream surface of the flow diverter to a point beyond the most downstream edge of the undercut.

Polymeric materials containing volatiles which were processed in the rotary processor included polystyrene, styrenic copolymers, polyolefins and low density polyethylene copolymers. During operation, the vacuum system of this invention was capable of continually maintaining a vacuum level of between about 5-12 mm Hg in the devolatilizing stage. This vacuum level provided removal of up to 99% of initial volatiles in some of the materials processed. No plugging of the vacuum port or the opening occurred during operation of the processor and barrel hangings were not observed in the devolatilizing passages during processor operation.

We claim:

1. A rotary processor for processing liquid material having volatiles contained therein and comprising:
  a plurality of processing passages formed by a rotatable element comprising a rotor carrying a plurality of annular processing channels, each channel having opposed side walls extending radially inwardly from the rotor surface, a stationary element having a coaxial closure surface spaced apart from the rotor surface to provide a clearance between the rotor and closure surface and cooperatively arranged with the channels to provide the plurality of processing passages, each processing passage having an inlet, an outlet and a channel blocking member associated with the stationary element and arranged so that material fed to the inlet can be carried forward by the rotating channel walls to the blocking member for discharge through the outlet, and one or more transfer grooves designed, sized and arranged for precluding material blockage by transferring the material from one passage to another; and wherein
  at least two of the processing passages provide a devolatilizing stage designed and arranged to cooperate with a vacuum source to evacuate the devoltilizing passages to separate at least some of the volatiles from the material; and characterized by
  a vacuum system for simultaneously evacuating the devolatilizing passages, which comprises a manifold associated with and extending outwardly from the stationary element and completely enclosing an opening through the stationary element extending axially over two or more passages of the devolatilizing stage to provide operational communication for transfer of the separated volatiles between the two or more devolatilizing passages and the vacuum source through a vacuum port provided by the manifold, the vacuum port being spaced apart from the opening sufficiently and the manifold, the opening and the vacuum port being designed and sized to provide sufficient cross-sectional area for transfer of the separated volatiles to substantially reduce vacuum loss, decrease pressure drop through the vacuum system and minimize orifice effects; and means to effectively prevent buildup of material on the closure surface at least in the region of the vacuum system including circumferential ribs arranged adjacent the axially upstream channel wall of the most upstream devolatilizing passage and adjacent the axially downstream channel wall of the most downstream devolatilizing passage, each circumferential rib extending radially into the passage to provide a close clearance between each rib and the adjacent wall and each circumferential rib arranged to extend in the direction of rotation from a point in the passage at or upstream of the leading edge of the opening to a point at or beyond the trailing edge of the opening.

2. A rotary processor according to claim 1 wherein the devolatilizing stage is arranged for separation of volatiles from thin films of material, each devolatilizing passage having a stationary spreader positioned near the inlet and extending radially into the channel of the passage and adapted to block movement of material in the passage and to spread the material as thin films on the rotating channel walls so that material is carried past the spreader as thin films providing a void space downstream of the spreader and wherein the opening is arranged for communication with the void space.

3. A rotary processor according to claim 1 wherein the devolatilizing stage is arranged to achieve a foam devolatilizing action utilizing a mass transfer mechanism involving nucleation of bubbles of volatiles within the material and unrestricted growth of the bubbles during plug-flow travel through each devolatilizing passage and rupture of the bubbles in non-pressurizing shearing zones within the devolatilizing stage, each devolatilizing passage having a flow diverter positioned near the inlet and between the inlet and the opening, the flow diverter extending radially into the channel of the passage and adapted to divert movement of material fed to the passage to the root of the channel.

4. A rotary processor according to claim 3 wherein the flow diverters extend radially into the channel of the passage no more than about one-half of the channel depth.

5. A rotary processor according to claim 1 wherein the closure surface provides an undercut at the trailing edge of the opening.

6. A rotary processor according to claim 5 wherein the circumferential ribs extend to a point at or beyond the most downstream edge of the undercut.

7. A rotary processor according to claim 1 wherein the circumferential ribs extend to a point beyond the trailing edge of the opening.

8. A rotary processor according to claim 1 wherein the circumferential ribs extend radially into the channel of the passage no more than about one-half of the channel depth.

9. A rotary processor according to claim 1 wherein the circumferential ribs extend radially into the channel of the passage no more than about one-quarter of the channel depth.

10. A rotary processor according to claim 1 wherein the clearance provided between the ribs and adjacent walls is between about 0.01 in. to about 0.25 in.

11. A rotary processor according to claim 1 wherein the opening extends over at least 10° of the circumference of the rotor.

12. A rotary processor according to claim 1 wherein the vacuum system provides a cross-sectional area available for transfer of vaporized volatiles sufficiently large to provide vapor velocities at or below 0.2 mach.

* * * * *